(12) United States Patent
Carlbom et al.

(10) Patent No.: US 6,233,007 B1
(45) Date of Patent: May 15, 2001

(54) METHOD AND APPARATUS FOR TRACKING POSITION OF A BALL IN REAL TIME

(75) Inventors: Ingrid B. Carlbom, Summit; Yves D. Jean, Scotch Plains; Sarma VGK Pingali, Basking Ridge, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/102,071

(22) Filed: Jun. 22, 1998

(51) Int. Cl.$^7$ ............................................ H04N 7/18
(52) U.S. Cl. ............................ 348/157; 348/169; 348/579
(58) Field of Search ........................... 348/139, 157, 348/169, 170, 579; 345/154; 358/520

(56) References Cited

U.S. PATENT DOCUMENTS

| | | | |
|---|---|---|---|
| 4,721,951 | * 1/1988 | Holler et al. | 345/154 |
| 5,416,513 | * 5/1995 | Morisaki | 348/169 |
| 5,512,974 | * 4/1996 | Abe et al. | 348/139 X |
| 5,854,633 | * 12/1998 | Cooper et al. | 345/154 X |
| 6,002,428 | * 12/1999 | Matsumura et al. | 348/169 |
| 6,031,568 | * 2/2000 | Wakitani | 348/169 |
| 6,140,997 | * 10/2000 | Tanaka | 345/154 |

OTHER PUBLICATIONS

"Tracking and Counting Moving People", M. Rossi and A. Bozzoli, IEEE 1994, pp. 212–216.

"Human Motion Analysis: A Review", J.K. Aggarwal and Q. Cai, IEEE 1997 ;;. 90–102.

"Asset–2: Real–Time Motion Segmentation and Shape Tracking", S.M. Smith and J.M. Brady, IEEE Transactions on Pattern Analysis and Machine Intelligence, vol. 17, No. 8, Aug. 1995, pp. 814–820.

"Towards Model–Based Recognition of Human Movements in Image Sequences", K. Rohr, CVGIP: Image Understanding, vol. 59, No. 1, Jan., pp. 94–115, 1994.

"Model–based vision: a program to see a walking person", David Hogg, School of Engineering and Applied Sciences, University of Sussex, Brighton, Sussex, UK.

"Towards a System for the Interpretation of Moving Light Displays", Richard F. Rashid, IEEE Transactions on Pattern Analysis and Machine Intelligence, vol. PAMI–2, No. 6, Nov. 1980, pp. 574–581.

(List continued on next page.)

Primary Examiner—Howard Britton

(57) ABSTRACT

A method and apparatus for tracking objects used in connection with athletic activities or sporting events, especially, balls, pucks, and the like. The method includes the steps of differencing present and previous frames of a video image including the, for example, ball to obtain motion regions, converting the motion regions to HSV color space, extracting the region corresponding to the ball based on empirical color data about the ball, obtaining a motion vector based on the motion of the ball region from a previous frame to the current frame, and updating the ball trajectory based on the newest motion vector obtained. The method also preferably includes a step of identifying completed trajectories based on preset constraints. The method is preferably expanded on by using at least one pair of cameras to provide a three-dimensional trajectory, and sometimes preferable expanded on by using a plurality of cameras, especially a plurality of pairs of cameras. An apparatus according to the present invention includes at least one camera connected to a computer which operates to difference previous and current frames, compute the ball track, convert ball regions to HSV color space and output the tracking and video information. In a case where one or more pairs of cameras are used, the computer is preferably also provided with a stereo matching device or module for matching the tracking results from respective cameras and/or respective pairs of cameras.

15 Claims, 4 Drawing Sheets

OTHER PUBLICATIONS

"Multiple Object Tracking System with Three Level Continuous Processes", Kazuhiro Fukui et al., IEEE 1992, ;;. 19–27.

"Image Sequence Analysis of Real World Human Motion", Koichiro Akita, Pattern Recognition vol. 17, No. 1, pp. 73–83, 1984.

Model–Based Image Analysis of Human Motion Using Constraint Propagation, Joseph O'Rourke and Norman I. Badler, IEEE Transactions on Pattern Analysis and Machine Intelligence, vol. PAMI–2, No. 6, Nov. 1980, pp. 522–536.

"Global color constancy: recognition of objects by use of illumination–invariant properties of color distributions", Glenn Healey and David Slater, J. Opt. Soc. Am. A., vol. 11, No. 11/Nov. 1994, pp. 3003–3010.

"Finding Trajectories of Feature Points in a Monocular Image Sequence", Ishwar K. Sethi and Ramesh Jain, IEEE Transactions on Pattern Analysis and Machine Intelligence, vol. PAMI–9, No. 1, Jan. 1987, pp. 56–73.

* cited by examiner

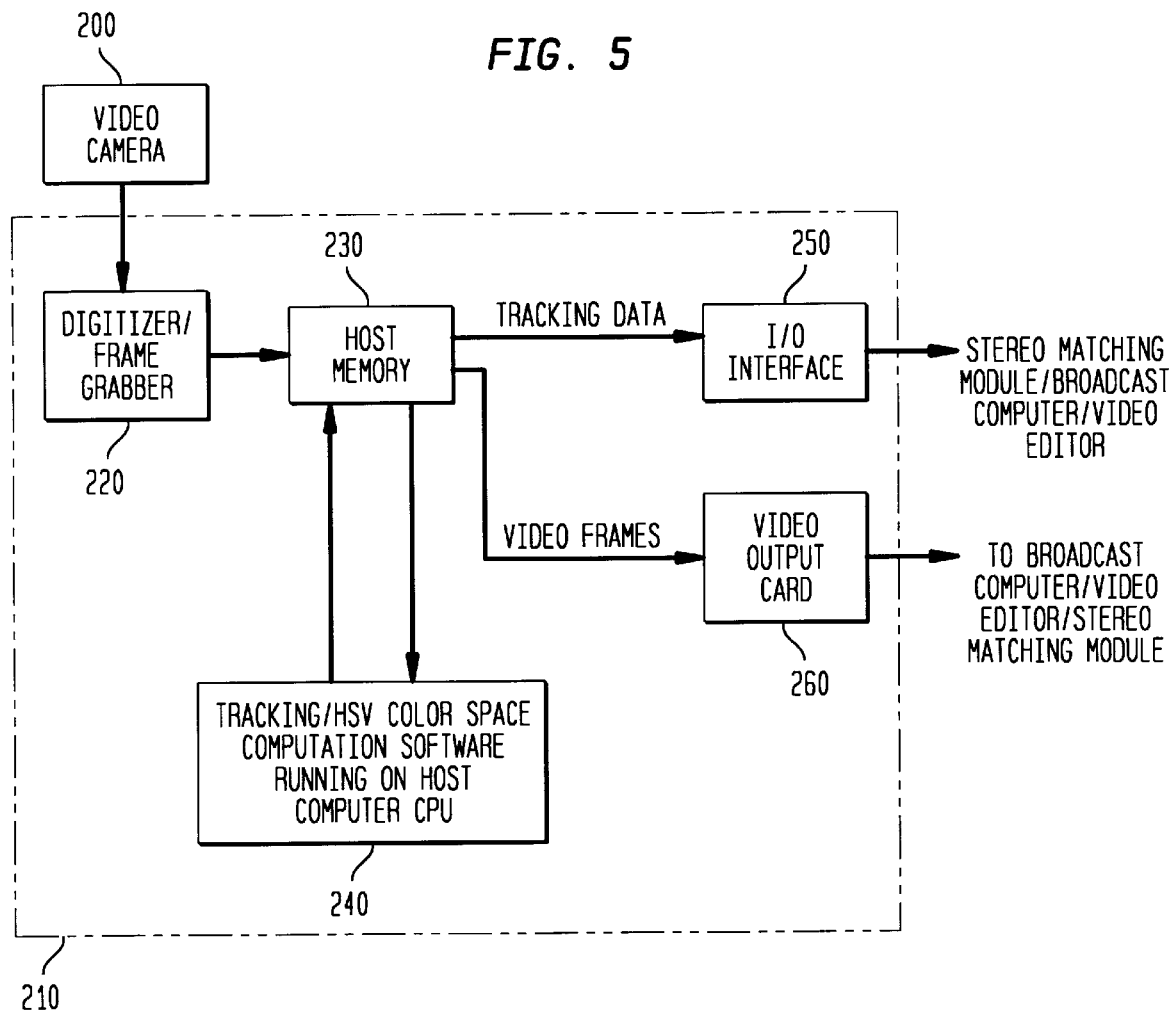

METHOD AND APPARATUS FOR TRACKING POSITION OF A BALL IN REAL TIME

BACKGROUND OF THE INVENTION

1. Field of the Invention

The present invention relates to a method and apparatus for tracking moving objects in real time whereby trajectories corresponding to the movement of the objects are determined. More particularly, the present invention relates to a method and apparatus for tracking moving objects, such as balls, pucks, and the like, in connection with sporting events and exploiting such tracking to derive information corresponding to the movement of the objects being tracked. The present invention particularly relates to a method and apparatus for tracking an object such as a tennis ball.

2. Description of Related Art

One field in which real time tracking would be particularly desirable, but is not currently greatly utilized, is in the field of sports. For example, continuous tracking of a tennis ball during a tennis match provides valuable information about the skill and strategy of a player because information such as ball speed and ball placement would be readily obtainable therefrom. The trajectory of the ball, obtained through such real time tracking can be used to obtain other information of interest, as well as form the basis for virtual camera views of play from any desired position, as well as form the basis for virtual replays of play.

However, the only conventional form of tennis ball tracking currently available is a radar gun used to measure speed of service.

In addition, real time tracking of objects such as athletes or balls in a sporting event is challenging, especially because it is difficult to obtain a clean segmentation of the ball from the background in view of changing lighting conditions, variations in clothing worn by athletes (especially with regard to color), differences in the characteristics (for example, reflectivity) of playing surfaces (grass, clay, hardwood, ice, etc.), and the fast and dynamic movement of athletes. Another factor is the presence of other moving objects or moving people (such as other players on the field, spectators, and the like).

Also, in the case of tracking a ball or the like, fundamentally, the ball is a relatively very small object (approximately 6.5 cm in diameter) travelling at relatively high speed (up to 67 m/s) over a relatively large area of a tennis court (24 m long by 11 m wide) in the presence of other, much larger moving objects (the players).

Conventionally, tracking systems for moving objects typically generate trajectories corresponding to the motion of an object within the view of a camera. The trajectories or tracks typically consist of a sequence of x,y (location) coordinates and time coordinates. The information from these trajectories has a variety of applications. For example, the information can be used to count the number of objects, such as a people or vehicles, crossing a reference line and to associate a particular direction with each crossing. In addition, such trajectories may be used to determine the number of people present within the field of view of a camera at any instant, which information is useful, for example, for product marketing such as determining the effectiveness of a particular advertisement or advertising technique in a store. Tracking systems may also be employed for measuring consumer traffic throughout, for example, the aisles of a store, etc., including the length of time that particular persons spend in specific aisles.

Several methods or systems have been developed for the tracking of moving objects, including people. However, these conventional systems do not yield a single motion region or even a consistent set of motion regions, which deficiencies are exacerbated when tracking athletes, balls, pucks, and like in the midst of highly dynamic movement.

For example, in Rashid, R. F., "Towards A System For The Interpretation Of Moving Light Displays", 2 IEEE Transactions on Pattern Analysis and Machine Intelligence, 574–581 (1980), a method is described for interpreting moving light displays (MLD). In general, Rashid teaches segmenting out from MLD images individual points corresponding to moving people. The individual points are grouped together to form clusters based on, inter alia, the positions and velocities of the individual points; the formed clusters represented individual objects. Tracking is performed by matching points between consecutive frames based on the relative distances between the location of points in the current frame and the location of predicted points in a previous frame. The predicted position is based on the average velocity of the point in the previous frame and the relative distance, which is calculated using a Euclidean function.

The technique described by Rashid has several drawbacks. Specifically, the MLD system requires several frames before a good object separation is obtained, and no criteria is provided for determining when satisfactory object separation has occurred. In addition, no mechanism is provided for propagating the generated clusters to prior and subsequent frames for continuity in the motion representation. This undermines real time operation.

In another tracking system described in Rossi, M. and Bozzoli, A., "Tracking And Counting Moving People", Proceedings Of The Second IEEE International Conference On Image Processing, 212–16 (1994), a vertically mounted camera is employed for tracking and counting moving people. This system operates under the assumption that people enter a scene along either the top or bottom of the image where altering zones are positioned for detecting people moving into the scene. In reality, however, people can also appear in a scene, inter alia, from behind another object or from behind an already-identified person. In other words, people may be wholly or partially occluded upon initially entering a scene and would not be identified by this system. The problem of identifying occluded persons is also present in the system described in Rohr, K., "Towards Model Based Recognition Of Human Movements In Image Sequences", 59 Computer Vision, Graphics And Image Processing: Image Understanding, 94–115 (1994). Such problems are clearly pertinent to real time tracking of a sporting event such as tennis.

In addition, the systems described in Smith, S. M., and Brady, J. M., "A Scene Segmenter: Visual Tracking of Moving Vehicles", 7 Engineering Applications Of Artificial Intelligence 191–204 (1994); and "ASSET-2: Real-Time Motion Segmentation And Shape Tracking", 17 IEEE Transactions On Pattern Analysis And Machine Intelligence, 814–20 (1995), are designed specifically for tracking objects such as moving vehicles, and accordingly identify features representing corners or abrupt changes on the boundaries of the vehicles.

By definition, this precludes use with balls and the like, which do not have corners or abrupt changes on their boundaries.

In U.S. patent application Ser. No. 08/586,012, filed on Dec. 29, 1995, an apparatus and method are disclosed for tracking moving objects in real time. In particular, an apparatus and method are disclosed in which local features, such as extrema of curvature on boundary contours, are tracked, and trajectories of motion are derived by dynamically clustering the paths of motion of the local features.

SUMMARY OF THE INVENTION

The present invention provides, most generally, a method and apparatus for tracking moving objects, particularly balls, pucks, and like used in sporting activities. More particularly, the invention provides an apparatus and method for obtaining information corresponding to the object being tracked. In one aspect of the present invention, such information is usable in a computer-generated replay of the sporting event (or some part thereof) using computer generated characters moving in accordance with motion data collected from real time tracking of the sporting event. In particular, the present invention is intended to be especially useful for enhancing television coverage of sporting events.

BRIEF DESCRIPTION OF THE DRAWINGS

The present invention will now be detailed with reference to the accompanying drawings, in which:

FIG. 5 is a schematic illustration of an example configuration of the apparatus according to the present invention.

DETAILED DESCRIPTION OF THE PRESENTLY PREFERRED EMBODIMENTS

The present invention will now be described in detail with reference to FIGS. 1 and 2, which collectively illustrate a basic method for tracking, by way of example, a tennis ball according to the present invention.

Figure 1:
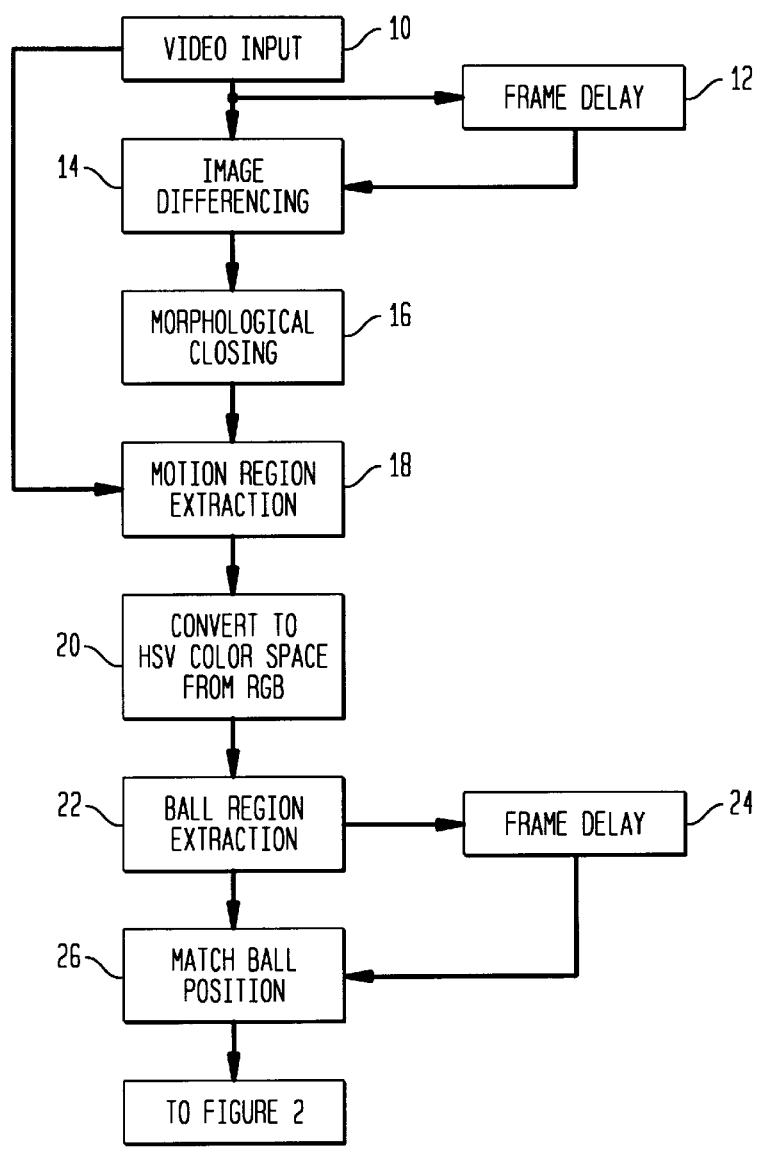
FIG. 1 is a flow chart illustrating a first portion of method for tracking, by way of example, a tennis ball.
Figure 2:
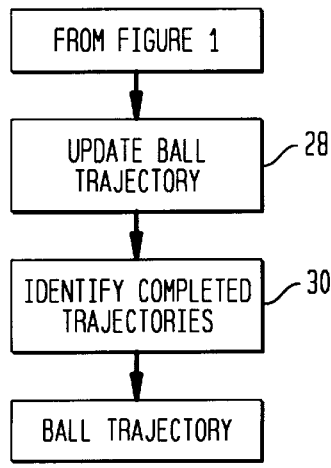
FIG. 2 is a continuation of the method illustrated in FIG. 1.

As seen in FIGS. 1 and 2, a video input is passed through a frame delay 12 in order to provide a current and previous frame, which are differenced (and preferably also thresholded) in step 14. Differencing and thresholding in this manner is particularly desirable as it is a fast operation which works across a variety of lighting conditions.

The video input 10 is either already in digital form using a digital video camera, or is an analog input passed through a conventional digitizer (not shown).

The result of the image differencing step 14 is a binary image. Small gaps or other discontinuities in the binary image may be closed using a conventional morphological closing operation, comprising dilation and erosion steps, as is conventional (see, for example, Giardina et al., "Morphological Methods in Image and Signal Processing," Prentice-Hall, 1988). The dilation operation essentially a filling element that is "wiped" across a motion region to fill in gaps or discontinuities therein left from the differencing operation. This dilation operation actually fills in a space beyond the actual contour of the motion region in order to ensure complete filling (hence, "dilation"). The erosion operation, as implied, uses the filling element again, but this time removes the "excess" filled portion past the contour of the motion region so as to leave a completely filled motion region having its original boundary or contour.

The result of the morphological closing step 16 is a binary image of the motion region(s) of interest. The binary image is simply digital data, and must be reassociated with an actual visual image. Therefore, as can be seen in FIG. 1, the input video 10 is coupled in a conventional manner in step 18 with the binary image of the motion regions so that a video image of the motion regions results.

The motion regions resulting after step 18 are converted into hue-saturation-intensity (HSV) space in a conventionally known manner in step 20. See, for example, Foley et al., "Computer Graphics: Principles and Practice," Addison-Wesley, 1990.

Based on preset bounds on the size of the ball and a hue-saturation model of the color of the ball (based on empirical data), the region corresponding to the tennis ball is extracted from the current frame (step 22). In step 26, the centroid of the ball region in current frame is matched with the centroid of the ball region extracted from the previous frame (via frame delay 24) to yield a vector of motion of ball between the two frames. This most recent vector is used to update the cumulative ball trajectory (step 28), which consists of a sequence of thus-obtained vectors describing the motion of the ball from moment to moment.

A completed trajectory is identified (step 30) as those for which there is no further match (ball out of view or out of play) or by preset constraints on the ball velocity (too slow to be in play) or by an external control indicating whether the ball is in play or not.

As will be readily appreciated, FIGS. 1 and 2 illustrate ball tracking with a single video input (i.e., a single camera) which yields a ball trajectory in the image plane, but not a three-dimensional trajectory which is often desirable.

Figure 3:
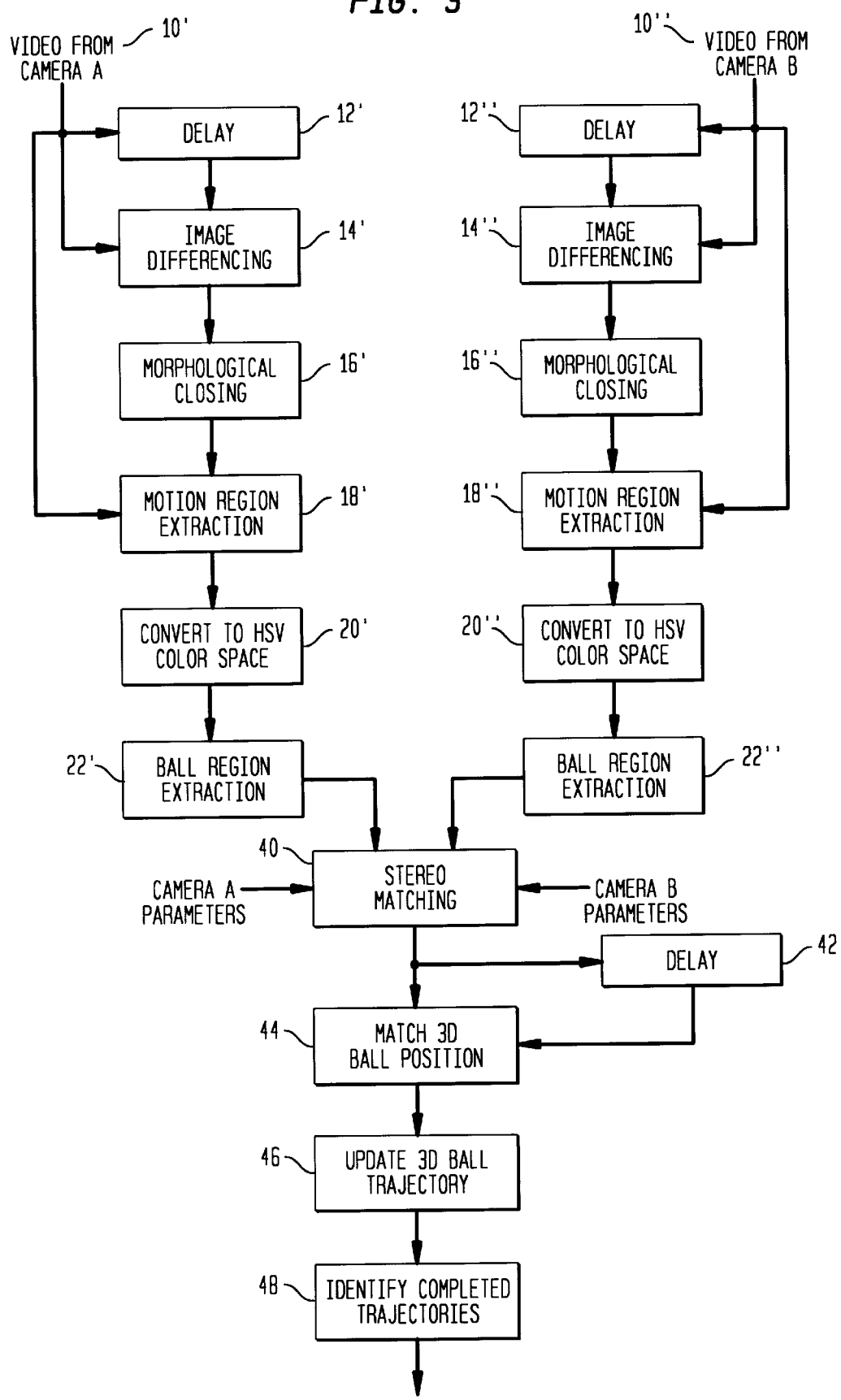
FIG. 3 is another embodiment of the present invention, illustrating a method for stereo tracking of a tennis ball with two video cameras.

FIG. 3 illustrates a two-camera tracking method in accordance with the present invention. For each camera A and B, the process described above relative to FIGS. 1 and 2, up to the step of ball region extraction, is applicable here as well, so a repeated explanation is avoided.

In step 40, the ball regions extracted from cameras A and B in steps 22' and 22", respectively, are input to a stereo matching module along with calibration parameters from cameras A and B. Using conventional positional triangulation techniques (based on the calibration parameters of cameras A and B such as position, orientation, relative position), the position of the ball is identified in three-dimensional space.

In step 44, the three-dimensional ball region in the current frame is matched with its counterpart in the previous frame (see frame delay 42), in a manner similar to that described relative to FIG. 1, and a three-dimensional vector corresponding to that match is obtained.

In step 46, the three-dimensional ball trajectory is updated based on the new vector obtained in step 44.

Finally, in step 48, completed three-dimensional trajectories are identified according to the same considerations discussed above relative to FIG. 1.

Because a tennis ball is so small and travels so fast relative to its length of travel (i.e., the length of the tennis court), several pairs of cameras may be useful to provide a three-dimensional ball trajectory at high resolution over the length of the court. Accordingly, FIG. 4 illustrates a method of ball tracking according to the present invention wherein the input from a plurality of pairs of cameras (as in FIG. 3) are coupled.

Figure 4:
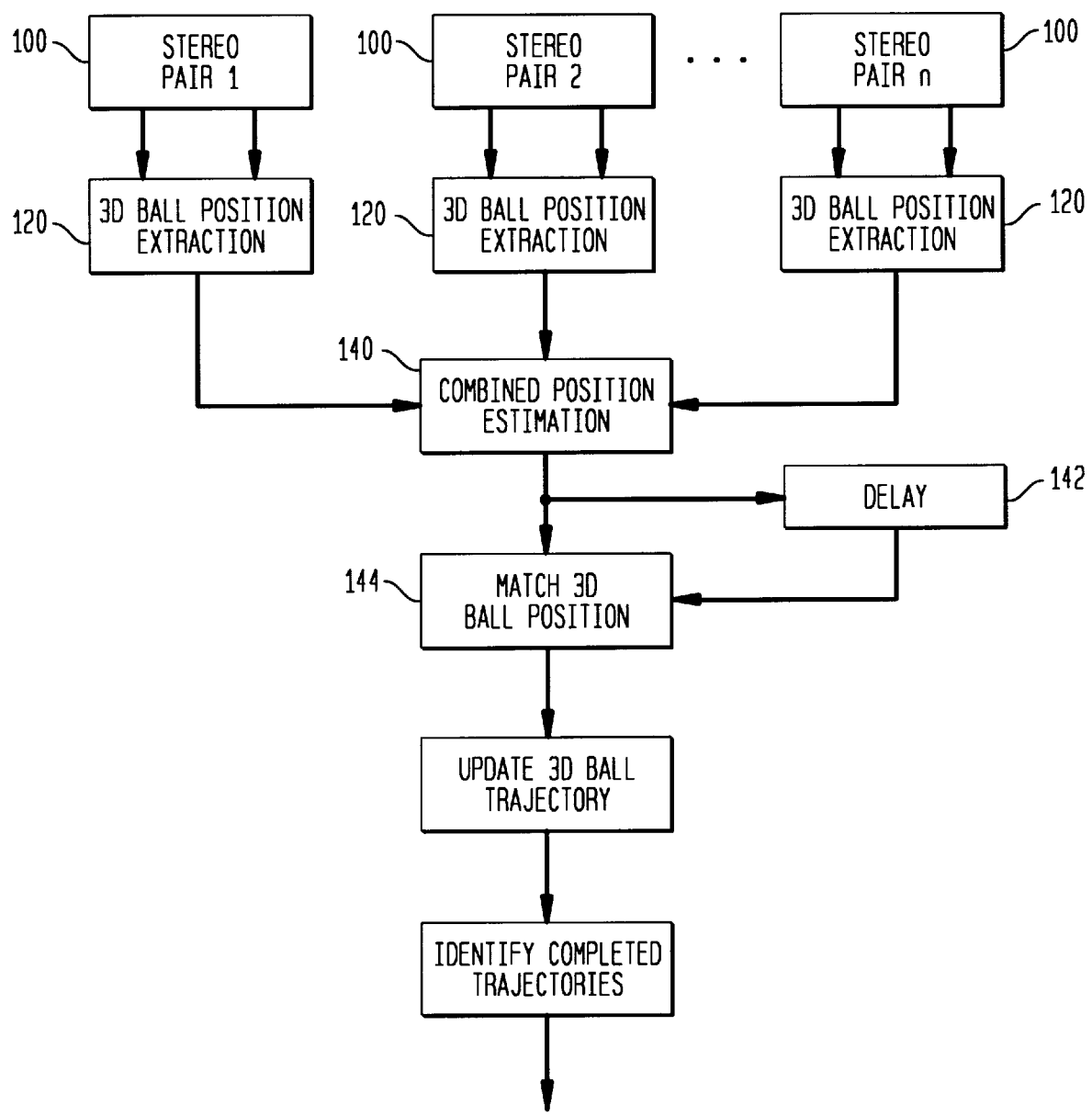
FIG. 4 is a variation of the embodiment of FIG. 3, utilizing a plurality of pairs of video cameras for high-resolution coverage of a tennis court.

As seen in FIG. 4, a plurality of n pairs of cameras 100 are provided. Step 120 encompasses the image processing of the ball in accordance with FIG. 2, up to and including step 40, as discussed above.

In step 140, the plurality of n ball positions obtained in step 120 are combined in the same manner as step 40 in FIG. 3. This yields a new instantaneous ball position in the current frame, based on the inputs of the n pairs of cameras 100, instead of only the one pair of cameras A and B in FIG. 3.

In step 144, the ball position in the current frame is matched with the ball position in a previous frame, obtained via frame delay 142.

The motion vector corresponding to the matching in step 144 is used to update the trajectory of the ball in step 146.

Finally in step 148, complete trajectories are identified with the same considerations as discussed relative to FIGS. 1 and 2, and FIG. 3.

FIG. 5 illustrates a schematic arrangement of an apparatus according to the present invention. It is emphasized that the illustration herein is strictly by way of example, and the present invention is meant to cover other arrangements useful in accordance with the foregoing.

Video camera 200 is connected to a host computer 210. Particularly, the camera 200 is connected to a frame grabber 220 operating as the frame delay 24. In addition, if the output from camera 200 is not in digital format, then the host computer 210 includes a digitizer, which, as shown, may be combined with the frame grabber 220. The frame grabber 220 provides a current frame and a previous frame, which are stored in a host memory 230. Connected to host memory 230 is a CPU 240, which in one arrangement according to the present invention runs appropriate software to carry out the tracking and HSV color space transformation operations. The host memory 230 receives the results of the operation of CPU 240 and outputs tracking data to an I/O interface 250 and outputs the video frames to a video output card 260. Both the I/O interface 250 and video card 260 output the tracking data and video frames as desired, such as to the stereo matching module, a broadcast computer, or a video editor. While the present invention is useful using one camera, it is expected that at least one pair of cameras, if not more, will be used to obtain three-dimensional tracking. Thus, the use of one or more pairs of cameras, as in FIGS. 3 and 4, respectively, can still be used according to the arrangement of FIG. 5, albeit with the addition to the host computer 210 of a device for stereo matching of the camera inputs (as in FIG. 3) and/or the inputs from the respective pairs of cameras (as in FIG. 4). Instead of a specific device for stereo matching, however, suitable software for stereo matching, based upon conventional methodologies, can be run on the CPU 240.

It will be appreciated that the ball trajectories obtained in accordance with the foregoing will have many applications, particularly in the analysis of the game and its players. For example, the trajectories thus obtained may be superimposed on an actual video image to visually illustrate ball placement. This could also include determining whether a ball lands in or out of bounds, and therefore would have potential application as a back-up for line judges. Also, an occupancy map of ball placement could be generated.

In addition, information such as ball speed and height at the apex of a trajectory can be extrapolated using known methods. The trajectories thus obtained also could be used as the data to drive a computerized "virtual replay" of the tennis match or some portion. In particular, the ball trajectory information could be used in conjunction with player tracking information to drive a virtual replay, in which computerized figures replay the previously tracked action. The views in such a replay could be constructed based on camera calibration parameters of virtual cameras, in a manner similar to the use of such parameters hereinabove.

It is particularly contemplated that the information obtained according to the present invention is useful in enhancing video broadcast of the sporting event (e.g., tennis) being tracked.

It is also noted that the discussion of tennis and tennis balls hereinabove is strictly by way of example, and the present invention is clearly useful with other forms of object tracking in general, and certainly with other types of sporting activities, especially those using small objects, such as pucks, other kinds of balls, and the like.

Thus, while there have been shown and described and pointed out fundamental novel features on the invention as applied to preferred embodiments thereof, it will be understood that various omissions and substitutions and changes in the form and details of the devices illustrated, and in their operation, and in the method illustrated and described, may be made by those skilled in the art without departing from the spirit of the invention. For example, it is expressly intended that all combinations of those elements and/or methods steps which perform substantially the same function in substantially the same way to achieve the same results are within the scope of the invention. It is the invention, therefore, to be limited only as indicated by the scope of the claims appended hereto.

What is claimed is:

1. A method for tracking an object using at least one video camera outputting a video image including a current frame and a previous frame, comprising the steps of:

obtaining a current frame and a previous frame of the video image including an image of the object;

differencing the current and previous frames to obtain a binary image including motion regions;

converting the binary image to hue saturation intensity space;

extracting a motion region corresponding to the object from the converted binary image based on a hue saturation model of the color of the object;

matching the motion region of the object in the current frame with the motion region of the object in the previous frame to obtain a motion vector corresponding to motion of the object between the previous frame and the current frame; and updating a trajectory of the object based on the motion vector of the object obtained in said matching step.

2. The method of claim 1, further comprising a step of morphologically closing the motion regions obtained in said differencing step.

3. The method of claim 1, further comprising a step of identifying a completed trajectory, including ending the trajectory if the motion vector obtained in said matching step indicates that the object is moving too slowly to be of interest.

4. The method of claim 3, said identifying step including ending the trajectory if no motion region corresponding to the object is obtained in said extracting step.

5. A method for tracking an object using at least one pair of video cameras, each outputting a video image including a current frame and a previous frame, the method comprising the steps of:

for each camera of the at least one pair of cameras:

obtaining a current frame and a previous frame of the video image including an image of the object;

differencing the current and previous frames to obtain a binary image including motion regions;

converting the binary image to hue saturation intensity space; and extracting a motion region corresponding to the object from the converted binary image based on a hue saturation model of the color of the object;

matching the motion regions corresponding to the object from each camera to obtain the motion region of the object in three-dimensional space;

obtaining a current frame and a previous frame and matching the three-dimensional motion region of the object in each, respectively, thereby obtaining a motion vector corresponding to the three-dimensional movement of the object from the previous frame to the current frame; and updating a three-dimensional trajectory of the object based on the three-dimensional motion vector of the object obtained in said obtaining step.

6. The method of claim 5, further comprising a step of performing a morphological closing step on the binary image obtained in said differencing step.

7. The method of claim 5, further comprising a step of identifying a completed trajectory, including ending the three-dimensional trajectory if the motion vector obtained in said matching step indicates that the object is moving too slowly to be of interest.

8. The method of claim 7, said identifying step including ending the trajectory if no motion region corresponding to the object is obtained in said extracting step.

9. A method for tracking an object using a plurality of pairs of video cameras, each outputting a video image including a current frame and a previous frame, the method comprising the steps of:

for each camera of the plurality of pairs of cameras:
obtaining a current frame and a previous frame of the video image including an image of the object;
differencing the current and previous frames to obtain a binary image including motion regions;
converting the binary image to hue saturation intensity space; and
extracting a motion region corresponding to the object from the converted binary image based on a hue saturation model of the color of the object;

matching the motion regions corresponding to the object from each camera in each pair of cameras to obtain a motion region of the object in three-dimensional space from each pair of cameras, respectively;

combining the motions of region corresponding to the object from each pair of cameras to obtain a single motion of region corresponding to the object, based on the motions of regions corresponding to the object from the plurality of pairs of cameras;

obtaining a current frame and a previous frame and matching the single three-dimensional motion region of the object in each, respectively, thereby obtaining a motion vector corresponding to the three-dimensional movement of the object from the previous frame to the current frame; and updating a three-dimensional trajectory of the object based on the three-dimensional motion vector of the object obtained in said obtaining step.

10. The method of claim 9, further comprising a step of performing a morphological closing step on the binary image obtained in said differencing step.

11. The method of claim 9, further comprising a step of identifying a completed trajectory, including ending the three-dimensional trajectory if the motion vector obtained in said matching step indicates that the object is moving too slowly to be of interest.

12. The method of claim 11, said identifying step including ending the trajectory if no motion region corresponding to the object is obtained in said extracting step.

13. An apparatus for tracking an object in real time comprising:

at least one video camera;

a computer connected to said at least one video camera, said computer including:
a frame grabber constructed and arranged to separating a current frame of a video image and a previous frame of the video image;
a host memory for storing the current and previous frames of the video image;
a CPU constructed and arranged to operate on the current and previous frames of the video image so as to derive tracking information corresponding to the object and to convert a binary image obtained in said derivation of tracking information into hue saturation intensity space, and to return said derived tracking information and said converted binary image to said host memory;
an I/O interface constructed and arranged to output said tracking information received from said host memory;
a video output card constructed and arranged to output the current and previous frames of the video image received from said host memory.

14. The apparatus of claim 13, comprising at least one pair of video cameras connected to said computer, said computer including a device for coupling, in visual stereo, the video image from each video camera of said at least one pair of video cameras.

15. The apparatus of claim 13, comprising at a plurality of pairs of video cameras connected to said computer.

* * * * *